Patented Jan. 10, 1950

2,494,418

UNITED STATES PATENT OFFICE 2,494,418

PAINT AND VARNISH

Joseph H. Wells and Philip J. Wilson, Jr., Pittsburgh, Pa., assignors to Carnegie-Illinois Steel Corporation, a corporation of New Jersey No Drawing. Application December 10, 1945, Serial No. 634,143

5 Claims. (Cl. 106—264)

In the preparation of paints and varnishes, it is necessary to include a component in the paint or varnish composition which will act as a drier for applied films of the paint or varnish so that the drying rate of the film will be speeded up and the paint or varnish film will dry without tackiness. These drying agents include, customarily, metallic naphthenate compounds such as lead, manganese, and cobalt naphthenates. However, it is well-recognized that these driers act as catalysts for oxidation of the film-forming components, even after an applied coating of the paint or varnish has dried, and too much drier causes the coating to become excessively chalky prematurely and to separate prematurely from the surface to which the coating has been applied. Consequently, great care must be exercised in the addition of such drying materials. Additionally, the driers impart color to the applied film, which often is not desirable, and the driers have little or no value in the final paint film.

In a paint made from a hardening or drying oil, pigment, thinner, and drier, or a varnish made from such an oil, resin, thinner, and drier, gum turpentine, properly refined, has been used in the past almost exclusively, but at present, petroleum thinners, such as V. M. P. Naphtha, or coal tar thinners, such as solvent naphtha, are being used extensively. The latter two thinners add no desirable properties to the final paint or varnish film, but are merely lost to the atmosphere by volatilization.

In view of the criticalness involved in the use of the conventional drying agents the investigations leading to the present invention were undertaken for the purpose of endeavoring to improve upon the conventional driers with respect to the care and criticalness involved in their addition to the paint or varnish.

As a result of these investigations, there has been evolved the present invention which is based upon the discovery that the oxides of dicyclopentadiene, such as dicyclopentadiene peroxide, dicyclopentadiene diperoxide or mixtures of such oxides act as a paint drier and in addition, impart increased wetting properties to the wet paint film and added toughness to the final paint or varnish film. These advantages are gained without the disadvantage possessed by the conventional paint driers of continuing the oxidation after the film is dry.

It is known that dicyclopentadiene will oxidize in air, but dicyclopentadiene itself is not a desirable addition to the present type of quick-drying paint and varnish formulations, because its rate of oxidation is too slow for the oxides formed thereby to act as catalysts in the drying of the paint film.

In practice, the peroxides of dicyclopentadiene are prepared by passing air or oxygen through dicyclopentadiene at temperatures of from 25° C. to 100° C., and preferably from about 30° C. to about 50° C. There is added from about 0.5 per cent to about 5.0 per cent of the resulting peroxides of dicyclopentadiene to a paint or varnish consisting of drying oil, pigment, and thinner, or drying oil, pigment resin, and thinner. It is found that any amount substantially less than 0.5 per cent of the peroxides in the paint or varnish formulation is not effective in producing a commercial rate of drying in a paint or varnish film, and more than 5 per cent of the oxides tends to produce a turbidity in the paint film. Generally speaking, it is preferred to add from 1 to 2 per cent of the peroxides of dicyclopentadiene. The dicyclopentadiene peroxides replace the usual metallic driers in any desired proportions up to complete replacement.

When air is passed through dicyclopentadiene under the above conditions, dicyclopentadiene peroxide is produced first, probably as represented by the equation:

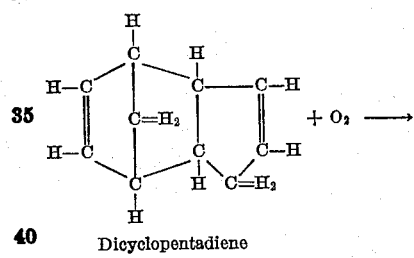

Dicyclopentadiene

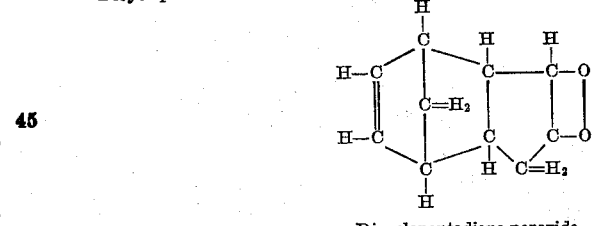

Dicyclopentadiene peroxide

With continued passage of air, the dicyclopentadiene peroxide is converted into dicyclopentadiene diperoxide, probably as represented by the equation:

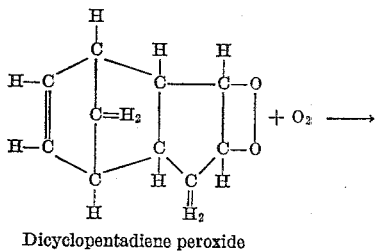

Dicyclopentadiene peroxide

Dicyclopentadiene diperoxide

While in practice either of these peroxides alone, or mixtures thereof, is found to be suitable, it is more convenient to employ a mixture of them, owing to the ease in which dicyclopentadiene peroxide is oxidized to the diperoxide, and it being not necessary to continue the passage of air to complete conversion to the diperoxide.

The quality of petroleum thinners for paints and varnishes can be materially improved by the addition of small amounts of dicyclopentadiene peroxide or diperoxide or mixtures of the peroxides of dicyclopentadiene. It is found that the addition of from 0.5 per cent to 1.0 per cent will impart to the petroleum thinners drying qualities similar to those of turpentine.

The term "dicyclopentadiene peroxides" employed in the appended claims is intended to include either dicyclopentadiene peroxide, dicyclopentadiene diperoxide, or mixtures thereof.

This application is a continuation-in-part of our copending application, Serial No. 425,452, filed January 2, 1942, entitled "Paint and varnish", and now abandoned.

We claim:
1. A coating composition of the class of paints and varnishes, including a glyceride type oil that hardens and dries by oxidation, and from 0.5 per cent to 5 per cent of a drier, of the group consisting of dicyclopentadiene peroxide, dicyclopentadiene diperoxide and mixtures thereof.

2. A coating composition of the class of paints and varnishes, including a glyceride type oil that hardens and dries by oxidation, and from 0.5 per cent to 5 per cent of a drier, composed of dicyclopentadiene peroxide.

3. A coating composition of the class of paints and varnishes, including a glyceride type oil that hardens and dries by oxidation, and from about 1 per cent to about 2 per cent of a drier, of the group consisting of dicyclopentadiene peroxide, dicyclopentadiene diperoxide and mixtures thereof.

4. A coating composition of the class of paints and varnishes, including a glyceride type oil that hardens and dries by oxidation, and a petroleum thinner containing from 0.5 per cent to 1 per cent of dicyclopentadiene peroxide for imparting thinning and drying properties to the said composition commensurate to those commonly obtained by the use of turpentine.

5. A coating composition of the class of paints and varnishes, including a glyceride type oil that hardens and dries by oxidation, and from 0.5 per cent to 5 per cent of a drier of the group consisting of dicyclopentadiene peroxide, dicyclopentadiene diperoxide and mixtures thereof, said drier being prepared by passing an oxygen containing gas through dicyclopentadiene at temperatures of from 25° C. to 100° C.

JOSEPH H. WELLS.
PHILIP J. WILSON, Jr.

REFERENCES CITED

The following references are of record in the file of this patent:

FOREIGN PATENTS

| Number | Country | Date |
|---|---|---|
| 118,079 | Great Britain | Dec. 16, 1918 |

OTHER REFERENCES

Chemical Reviews, vol. 34, No. 1, Wilson, Jr. and Wells, page 12.

Certificate of Correction

Patent No. 2,494,418                                            January 10, 1950

JOSEPH H. WELLS ET AL.

It is hereby certified that error appears in the printed specification of the above numbered patent requiring correction as follows:

Column 2, last formula, right-hand portion thereof, for

and that the said Letters Patent should be read with this correction therein that the same may conform to the record of the case in the Patent Office.

Signed and sealed this 9th day of May, A. D. 1950.

[SEAL]

THOMAS F. MURPHY,
*Assistant Commissioner of Patents.*